United States Patent
Carlson

(10) Patent No.: US 10,614,199 B2
(45) Date of Patent: *Apr. 7, 2020

(54) ONLINE ACCOUNT ACCESS CONTROL BY MOBILE DEVICE

(71) Applicant: Visa International Service Association, San Francisco, CA (US)

(72) Inventor: Mark Carlson, Half Moon Bay, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/297,186

(22) Filed: Mar. 8, 2019

(65) Prior Publication Data

US 2019/0205510 A1 Jul. 4, 2019

Related U.S. Application Data

(63) Continuation of application No. 15/059,191, filed on Mar. 2, 2016, now Pat. No. 10,275,582, which is a
(Continued)

(51) Int. Cl.
*H04L 29/06* (2006.01)
*G06F 21/31* (2013.01)
*H04W 12/06* (2009.01)

(52) U.S. Cl.
CPC ............. *G06F 21/31* (2013.01); *H04L 63/08* (2013.01); *H04W 12/06* (2013.01); *H04L 63/0892* (2013.01)

(58) Field of Classification Search
CPC . H04L 63/0861; H04L 63/08; H04L 63/0876; H04L 63/101; H04L 63/0892; H04L 63/06; G06F 21/31
See application file for complete search history.

(56) References Cited

U.S. PATENT DOCUMENTS

| 5,530,438 A | 6/1996 | Bickham et al. |
| 5,615,110 A | 3/1997 | Wong |

(Continued)

FOREIGN PATENT DOCUMENTS

| AU | 2003201332 | 6/2004 |
| AU | 2005279689 | 4/2008 |

(Continued)

OTHER PUBLICATIONS

Shintaro Mizuno et al., Authentication Using Multiple Communication Channels, Nov. 11, 2005, ACM, pp. 54-62. (Year: 2005).*

(Continued)

*Primary Examiner* — Luu T Pham
*Assistant Examiner* — Fahimeh Mohammadi
(74) *Attorney, Agent, or Firm* — Kilpatrick Townsend & Stockton LLP

(57) ABSTRACT

Systems and methods for controlling access to an online account are described. An access control message including an action to be performed on an online account can be sent from a mobile device to a server. The server may identify the mobile device based on identifying information in the access control message. Upon identifying the mobile device, the server may determine whether the user has authority to initiate the action to be performed on the online account. Upon determining that a user of the mobile device does have authority to initiate the indicated action, the action indicated in the access control message may be taken with respect to the online account.

18 Claims, 6 Drawing Sheets

Related U.S. Application Data continuation of application No. 13/714,995, filed on Dec. 14, 2012, now Pat. No. 9,317,672.

(60) Provisional application No. 61/570,680, filed on Dec. 14, 2011.

(56) References Cited

U.S. PATENT DOCUMENTS

| | | | |
|---|---|---|---|
| 5,878,337 A | 3/1999 | Joao et al. | |
| 5,883,810 A | 3/1999 | Franklin et al. | |
| 5,903,830 A | 5/1999 | Joao et al. | |
| 5,953,710 A | 9/1999 | Fleming | |
| 5,954,793 A | 9/1999 | Stutman et al. | |
| 5,991,749 A | 11/1999 | Morrill, Jr. | |
| 6,044,360 A | 3/2000 | Picciallo | |
| 6,064,990 A | 5/2000 | Goldsmith | |
| 6,273,335 B1 | 8/2001 | Sloan | |
| 6,422,462 B1 | 7/2002 | Cohen | |
| 6,529,725 B1 | 3/2003 | Joao et al. | |
| 6,535,855 B1 | 3/2003 | Cahill et al. | |
| 6,879,965 B2 | 4/2005 | Fung et al. | |
| 6,891,811 B1 | 5/2005 | Smith et al. | |
| 7,089,022 B1 | 8/2006 | Kaplan | |
| 7,089,208 B1 | 8/2006 | Levchin et al. | |
| 7,096,003 B2 | 8/2006 | Joao et al. | |
| RE39,736 E | 7/2007 | Morrill, Jr. | |
| 7,264,154 B2 | 9/2007 | Harris | |
| 7,343,149 B2 | 3/2008 | Benco et al. | |
| 7,355,990 B2 | 4/2008 | Smith et al. | |
| 7,357,310 B2 | 4/2008 | Calabrese et al. | |
| 7,685,037 B2 | 3/2010 | Reiners et al. | |
| 7,702,578 B2 | 4/2010 | Fung et al. | |
| 7,707,120 B2 | 4/2010 | Dominguez et al. | |
| 7,712,655 B2 | 5/2010 | Wong | |
| 7,742,984 B2 | 6/2010 | Mohsenzadeh | |
| 7,753,265 B2 | 7/2010 | Harris | |
| 7,865,414 B2 | 1/2011 | Fung et al. | |
| 7,945,240 B1 | 5/2011 | Klock et al. | |
| 7,954,706 B2 | 6/2011 | Calabrese et al. | |
| 8,074,879 B2 | 12/2011 | Harris | |
| 8,145,566 B1 | 3/2012 | Ahuja et al. | |
| 8,170,527 B2 | 5/2012 | Granucci et al. | |
| 8,346,659 B1 | 1/2013 | Mohsenzadeh | |
| 8,352,362 B2 | 1/2013 | Mohsenzadeh | |
| 8,370,265 B2 | 2/2013 | Coulter et al. | |
| 8,401,963 B2 | 3/2013 | Mohsenzadeh et al. | |
| RE44,467 E | 8/2013 | Morrill, Jr. et al. | |
| 8,543,497 B1 | 9/2013 | Mohsenzadeh et al. | |
| 9,317,672 B2 | 4/2016 | Carlson | |
| 2002/0052754 A1 | 5/2002 | Joyce et al. | |
| 2002/0129264 A1 | 9/2002 | Rowland et al. | |
| 2003/0187788 A1 | 10/2003 | Rothfarb | |
| 2004/0078325 A1 | 4/2004 | O'Connor et al. | |
| 2005/0263588 A1 | 12/2005 | Babi et al. | |
| 2006/0015742 A1* | 1/2006 | Camaisa | G06F 21/31 |
| | | | 713/182 |
| 2006/0015743 A1 | 1/2006 | Camaisa et al. | |
| 2006/0261152 A1 | 11/2006 | Wong | |
| 2007/0045403 A1 | 3/2007 | Slonecker | |
| 2007/0198432 A1 | 8/2007 | Pitroda et al. | |
| 2007/0233615 A1 | 10/2007 | Tumminaro | |
| 2007/0266257 A1 | 11/2007 | Camaisa et al. | |
| 2008/0020144 A1 | 1/2008 | Poletek et al. | |
| 2008/0086759 A1* | 4/2008 | Colson | G06F 21/34 |
| | | | 726/2 |
| 2008/0189773 A1 | 8/2008 | Maiorano et al. | |
| 2008/0250477 A1* | 10/2008 | Samuelsson | H04L 9/321 |
| | | | 726/4 |
| 2008/0319779 A1* | 12/2008 | Hughes | G06Q 30/06 |
| | | | 705/310 |
| 2009/0327134 A1* | 12/2009 | Carlson | G06Q 20/04 |
| | | | 705/44 |
| 2010/0057619 A1* | 3/2010 | Weller | G06Q 20/02 |
| | | | 705/67 |
| 2010/0223145 A1* | 9/2010 | Dragt | G06Q 20/20 |
| | | | 705/17 |
| 2010/0274691 A1* | 10/2010 | Hammad | G06Q 20/3221 |
| | | | 705/30 |
| 2011/0016049 A1 | 1/2011 | Kilfoil | |
| 2011/0098030 A1 | 4/2011 | Luoma | |
| 2011/0099108 A1 | 4/2011 | Fung et al. | |
| 2011/0106702 A1 | 5/2011 | Fung et al. | |
| 2012/0003957 A1* | 1/2012 | Agevik | H04L 63/126 |
| | | | 455/410 |
| 2012/0028609 A1 | 2/2012 | Hruska | |
| 2012/0066034 A1* | 3/2012 | Nolan | G06Q 20/10 |
| | | | 705/14.1 |
| 2012/0066107 A1* | 3/2012 | Grajetzki | G06Q 20/04 |
| | | | 705/35 |
| 2012/0077461 A1* | 3/2012 | Das | H04L 63/0884 |
| | | | 455/410 |
| 2012/0095911 A1* | 4/2012 | Ibasco | G06Q 20/10 |
| | | | 705/39 |
| 2012/0310824 A1 | 12/2012 | Liberty et al. | |
| 2013/0086684 A1* | 4/2013 | Mohler | G06F 21/53 |
| | | | 726/24 |
| 2013/0139222 A1 | 5/2013 | Kirillin et al. | |
| 2013/0160104 A1 | 6/2013 | Carlson | |
| 2015/0019424 A1 | 1/2015 | Pourfallah et al. | |
| 2016/0183092 A1 | 6/2016 | Carlson | |

FOREIGN PATENT DOCUMENTS

| | | |
|---|---|---|
| KR | 1020100032876 | 3/2010 |
| WO | 2008024870 | 2/2008 |
| WO | 2011051549 | 5/2011 |
| WO | 2012027694 | 3/2012 |
| WO | 2013090797 | 6/2013 |
| WO | 2013126815 | 8/2013 |

OTHER PUBLICATIONS

Le-Pong Chin et al., SIM Card Based e-Cash Applications in the Mobile Communication System Using OTA and STK Technology, Nov. 6-9, 2006, IEEE, pp. 1-3. (Year: 2006).*

Xing Fang et al., Online Banking Authentication Using Mobile Phones, Jun. 10, 2010, IEEE, pp. 1-5. (Year: 2010).*

Hany Harb et al., SecureSMSPay: Secure SMS Mobile Payment Model, Aug. 20-23, 2008, IEEE, pp. 1-7. (Year: 2008).*

U.S. Appl. No. 13/714,995, "Final Office Action", dated Sep. 26, 2014, 24 pages.

U.S. Appl. No. 13/714,995, "Non-Final Office Action", dated Jun. 3, 2015, 20 pages.

U.S. Appl. No. 13/714,995, "Non-Final Office Action", dated May 9, 2014, 21 pages.

U.S. Appl. No. 13/714,995, "Notice of Allowance", dated Dec. 3, 2015, 17 pages.

U.S. Appl. No. 14/379,478, "Final Office Action", dated Jul. 24, 2017, 30 pages.

U.S. Appl. No. 14/379,478, "Non-Final Office Action", dated Feb. 9, 2017, 20 pages.

U.S. Appl. No. 15/059,191, "Final Office Action", dated Dec. 13, 2017, 37 pages.

U.S. Appl. No. 15/059,191, "Non Final Office Action", dated Jun. 14, 2018, 37 pages.

U.S. Appl. No. 15/059,191, "Non-Final Office Action", dated May 5, 2017, 31 pages.

U.S. Appl. No. 15/059,191, "Notice of Allowance", dated Jan. 4, 2019, 19 pages.

U.S. Appl. No. 61/428,144, "U.S. Provisional Patent Application", Management of Prefunded Accounts, Dec. 29, 2010, 26 pages.

U.S. Appl. No. 61/601,935, "U.S. Provisional Patent Application", Mobile Payment Application, Feb. 22, 2012, 21 pages.

AP/P/2014/007920, "Office Action", dated Feb. 5, 2016, 3 pages.

Carminati et al., "A Semantic Web Based Framework for Social Network Access Control", ACM, 14th ACM Symposium on Access Control Models and Technologies, Jun. 2009, pp. 177-186.

(56) References Cited

OTHER PUBLICATIONS

Chin et al., "SIM card based e-cash applications in the mobile communication system using OTA and STK technology", Wireless, Mobile and Multimedia Networks, IET International Conference, Nov. 6-9, 2006, pp. 1-3.
Fang et al., "Online Banking Authentication Using Mobile Phones", Future Information Technology (FutureTech), 5th International Conference, May 21-23, 2010, 5 pages.
Harb et al., "SecureSMSPay: Secure SMS Mobile Payment model", Anti-counterfeiting, Security and Identification, 2nd International Conference, Aug. 20-23, 2008, pp. 11-17.
Hornyack et al., "These Aren't the Droids You're Looking for", Computer and Communications Security, ACM, 2 Penn Plaza, Suite 701 New York NY 10121-0701 USA, Oct. 17, 2011, pp. 639-651.
Mizuno et al., "Authentication using Multiple Communication Channels", ACM, Proceedings of the 2005 Workshop on Digital Identity Management, Nov. 11, 2005, pp. 54-62.
PCT/US2012/069870, "International Preliminary Report on Patentability", dated Jun. 26, 2014, 8 pages.
PCT/US2012/069870, "International Search Report and Written opinion", dated Apr. 30, 2013, 11 Pages.
PCT/US2013/027481, "International Preliminary Report on Patentability", dated Sep. 4, 2014, 8 pages.
PCT/US2013/027481, "International Search Report and Written opinion", dated Jun. 21, 2013, 11 pages.
Yu et al., "Achieving Secure, Scalable, and Fine-grained Data access Control in Cloud Computing", 2010 Proceedings IEEE INFOCOM, May 6, 2010, pp. 1-9.

\* cited by examiner

ONLINE ACCOUNT ACCESS CONTROL BY MOBILE DEVICE

CROSS-REFERENCES TO RELATED APPLICATIONS

The present application is a continuation of U.S. application Ser. No. 15/059,191 filed Mar. 2, 2016, which is a continuation of U.S. application Ser. No. 13/714,995, filed Dec. 14, 2012 which claims priority to U.S. Provisional Application No. 61/570,680, filed on Dec. 14, 2011, the entire contents of which are herein incorporated by reference for all purposes.

BACKGROUND

Online accounts for e-mail, social networks, financial account management, and online shopping are increasingly ubiquitous. When an online account is established, a customer typically provides login information such as a username and password combination that is used by the customer to gain access to the account.

An online account may be compromised, allowing an unauthorized user to gain access to the account. For example, if an unauthorized user discovers the login information for an account, the unauthorized user may enter the login information to access the account. The unauthorized user may use the account to engage in activity that is damaging to the customer who holds the online account. For example, the unauthorized user may send e-mail from an customer's e-mail account to the customer's e-mail contacts. If an unauthorized user gains access to an enrollee's social network account, the unauthorized user may post unwanted content to the social network account. Unauthorized access to an online account associated with a financial account can be particularly dangerous as the unauthorized user may make unauthorized purchases using the financial account.

When an unauthorized user gains access to the login information for accessing an account, it may be difficult for the customer to regain control of the account. The customer may be required to make a call to the online account provider or visit a physical location of the online account provider to access the account again. These requirements may inconvenience the customer, particularly if the customer is left without access to the account for an extended period of time while taking steps to regain control of the account.

Embodiments of the invention solve these and other problems.

BRIEF SUMMARY

Techniques are described for controlling access to an online account with a mobile device. An online account user can send a message, such as an SMS message, indicating an action to take on the account.

One embodiment is directed to a method for controlling access to an online account. An access control message can be received from a mobile device. The access control message can include an action to be performed on an online account. The online account may be accessible using login information. A user verification query message can be sent to the mobile device. A user verification response message can be received from the mobile device. The user verification response message can include verification information that is different from the login information for the online account. The user verification response message can be verified by comparing the verification information to stored information. If the user verification response message is successfully verified, the action indicated in the access control message can be performed.

Another embodiment is directed to a mobile device. The mobile device can include a processor and a computer readable medium coupled to the processor. The computer readable medium may include code executable the processor. The code may be operative to send an access control message to a server. The access control message can include an action to be performed on an online account. The online account can be accessed using login information. A user verification query message can be received from the server. The mobile device can send a user verification response message to the server. The user verification response message may include verification information that is different from the login information for the online account. If the user verification response message is verified by the server, the action indicated in the access control message may be performed on the online account.

A further embodiment is directed to a system for controlling access to an online account. The system can include a processor and a computer readable medium coupled to the processor. The computer readable medium can include code executable the processor. The code may be operative to receive an access control message from a mobile device. The access control message can include an action to be performed on an online account. The online account can be accessed using login information. A user verification query message may be sent to the mobile device. A user verification response message may be received from the mobile device. The user verification response message can include verification information that is different from the login information for the online account. The user verification response message can be verified by comparing the verification information to the stored information. If the user verification response message is verified, the action indicted in the access control message can be performed on the online account.

DETAILED DESCRIPTION

Figure 1:
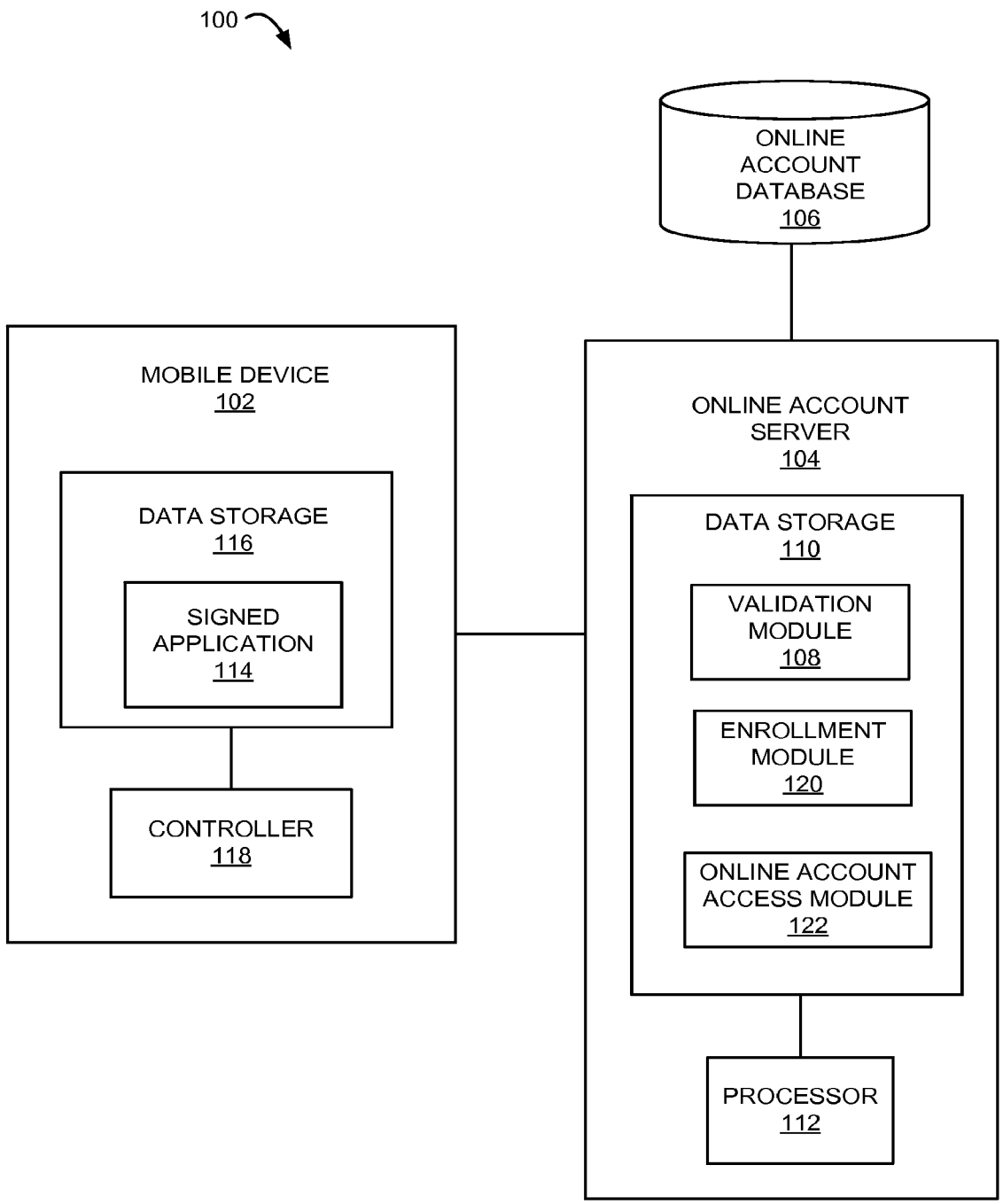
FIG. 1 is an illustrative block diagram of a system for controlling access to an online account.

Systems and methods are described for controlling access to an online account. The online account can include login information used for accessing the account. If a user wishes to disable or enable the ability for the online account to be accessed with the login information, the user may send an access control message to a server. For example, the user may use a mobile device such as a cellular phone to send a message such as an SMS to the server. The access control message may include a command, such as "lock" or "unlock." The access control message may be received by a server capable of controlling the online account.

The mobile device may subsequently receive a user verification query message. For example, the server may send a user verification query message to the mobile device. The user verification query message may include a request for the user to enter verification information, such as the last four numbers of a social security number or other personal information.

The user may send a user verification response message from the mobile device in response to the user verification query message. The user verification response message may include verification information responsive to a query in the user verification query message.

When the user verification response message is received from the mobile device, the verification information may be compared to stored verification information. For example, the server may receive the user verification response message and compare verification information from the message to verification information stored in the server in association with the online account. If the received verification information matches the stored verification information, the server may perform the action specified in the access control message. For example, if the access control message included a "lock" command, the server may lock the online account. Locking the online account may render the online account inaccessible. For example, it may not be possible to login to the online account using the login information associated with the online account while the online account is locked. If the user subsequently sends an access control message including an "unlock" command, the online account may be unlocked. For example, when the online account is unlocked, it may be possible to login to the online account using the login information.

Terms used to describe embodiments herein can be understood with reference to the descriptions provided below:

An "online account" can be any account that can be used via a connection to a network such as the Internet. Examples of online accounts include e-mail, instant message, voice communication, social network accounts, customer accounts associated with one or more merchants, media accounts (associated with applications for managing stored media, receiving streamed media and/or downloading media, etc.), game accounts, and accounts associated with various other services such as money transfer services. In some embodiments, an online account can provide tools related to a financial account, such as a bank account, credit card account, debit card account, loan management account, bill payment management account, etc.

When an online account is created, a user may be prompted to provide login information. "Login information" may include a password and an identifier such as a username, e-mail address, or other user identification. The login information may be selected by or assigned to the user. When login information is correctly entered in an interface for an online account, access to the online account may be granted.

"Verification information" can be information used to verify that an authorized user is taking action with respect to an online account. In some embodiments, verification information is information associated with a mobile device. For example, verification information can include identifying information for a device, such as a Mobile Subscriber Integrated Services Digital Network (MSISDN) number or other telephone number associated with the device, International Mobile Subscriber Identity (IMSI) number, International Mobile Station Equipment Identity (IMEI) number, media access control (MAC) address, internet protocol (IP) address, or other device identification. In some embodiments, verification information includes personal information, such as the last four numbers of a user's social security number, a mother's maiden name, city of birth, etc. A user may be prompted to provide verification information when an account is established, or a user may elect to or be prompted to provide verification information at a later time. Verification information can be entered by the user and stored by a server in association with an online account. In a preferred embodiment, verification information is identifying information for a device other than the device used to create the online account. For example, a user can enter a telephone number associated with the user's cellular phone when the user establishes the online account using a personal computer. Alternatively, verification information about a user may be determined from sources other than user input. In some embodiments, verification information can be acquired from a mobile device during a mobile device registration process. For example, an application executing on a server or on a mobile device may be capable of determining verification information for a mobile device and transmitting the verification information to a server for storage in association with a user's online account. Verification information can also be a code generated by an online account server, an encrypted message or cryptographic hash generated by a mobile device, or a message generated by a signed application of a mobile device. Other forms of identification and information may be used as verification information.

A "mobile device" can include any device capable of sending and receiving electronic communications through a network. For example, a mobile device may be a cellular telephone, media player, tablet, laptop computer, or other device. The mobile device may be capable of communicating with a cellular network, local area network, the internet or other network via a wired or wireless connection. Wireless connections may occur via 3G, EDGE, WiFi, or other mobile communication technologies or short range communication technologies such as WiFi, Bluetooth, or other wireless protocols. Typically, a mobile device is configured to be carried by a user.

A "message" can be information transmitted from the mobile device and received by a server. For example, the message may be a short message service (SMS) communication, an e-mail, an instant message, or a message originated by an application of the mobile device, such as a digitally signed application configured to validate an online account.

A digital signature may be applied to data to demonstrate the authenticity of the data. For example, an encryption algorithm such as an RSA algorithm may be applied to an application to be installed on mobile device. The digital signature may allow the mobile device to determine that the application to be installed on the mobile device (e.g., the executable file) is authentic and unaltered. In some embodiments, an encryption algorithm may be applied to a message sent by the mobile device. For example, key stored on the mobile device, such as a private key, may be used to sign the message. A key stored on online account server, such as a public key, may be used to allow the server to determine that the message is authentic and unaltered.

FIG. 1 shows an illustrative block diagram of a system for controlling access to an online account, according to an embodiment. The system 100 can include mobile device 102. Mobile device 102 may be configured to exchange messages with online account server 104. For example, mobile device 102 may be communicatively coupled to online account server 104 via a network connection.

Online account server 104 may be a server operated by an online account provider for providing online account functionality to users. Alternatively, online account server 104 may be operated by a partner of the online account provider for providing verification services.

Online account server 104 may be communicatively coupled to one or more online account databases 106. Login information, verification information, and other data associated with an online account may be stored on one or more online account databases 106. In some embodiments, online account server 104 communicates with another server that is communicatively coupled to one or more online account databases 106. When online account server 104 communicates with online account databases 106 through another server, the other server may be configured to perform an action on an online account.

Online account server 104 may include validation module 108. Validation module 108 may be a set of instructions stored on data storage element 110 and executed by a processor 112 of online account server 104 for receiving an access control message from a mobile device. Processor 112 may be communicatively coupled to data storage element 110. Validation module 108 may be further configured to send a user verification query message to mobile device 102 and receive a user verification response message from mobile device 102. Validation module may also be configured to verify a user verification response message, for example, by comparing verification information of the verification response message to stored verification information. Verification information may be stored on a data storage element 110 of online account server 104 or on online account database 106. If validation module 108 does not recognize a device, the user can be provided with an alert that the user verification response message was not successfully verified.

Data storage element 110 can store additional modules having instructions that can be executed by the processor to perform various functions for an online account system. It will be recognized that these modules could be alternatively stored and executed on a server communicatively coupled to online account server 104 and/or online account database 106.

For example, data storage element 110 can store an enrollment module 120. Enrollment module 120 can provide a user with a form having fields in which the user can input information such as username, password, contact information and other information pertinent to a particular online account. The form may be displayed on mobile device 102 or another device communicatively coupled to online account server 104. In some embodiments, enrollment module 120 can be configured to register mobile device 102. For example, enrollment module 120 may request that a user input identifying information for a mobile device, such as a phone number associated with the mobile device. Enrollment module 120 may alternatively obtain identifying information from the mobile device without requiring user input, for example, by interacting with one or more applications executed by mobile device 102 to obtain information such as a MSISDN number and/or IMSI. The identifying information may be used as verification information.

In a further example, data storage element 110 can store online account access module 122. Online account access module 122 can provide logic for granting and denying access to an online account. For example, if an access control message has been received by online account server 104 from mobile device 102 and the access control message indicates that access to the online account should be disabled (a "locked" state), online account access module 122 may prevent the account from being accessed even when login information for the online account is correctly entered. Similarly, if an access control message is received indicating that access to the online account should be disabled (an "unlocked" state), online account access module 122 may allow access to the online account when login information is correctly entered. In some embodiments, the online account access module executes an action indicated by an access control message only after a user verification response message has been received from mobile device 102 and verification information in the user verification response message has been verified.

In other embodiments, the online account access module 122 can include a verification code generation module. The verification code generation module can generate a verification code each time an access control message is received from mobile device 102. A user verification query message including the generated code can be sent from online account server 104 to mobile device 102. The online account access module may execute an action indicated by an access control message only if a user verification response message sent from mobile device 102 to online account server 104 includes the generated code, as verified by validation module 108. In further embodiments, the user can provide the code in addition to login information on an attempt to access the online account if the account was previously locked, deactivated, suspended, etc.

In some embodiments, an application 114 is stored on a data storage element 116 of mobile device 112 and is executed by a controller 118 communicatively coupled to data storage element 116. For added security, application 114 may be a digitally signed application.

Data storage elements 110 and 116 may be computer readable media such as a memory or hard drive. A computer readable medium can include a fixed disk or a system memory, disk drives, optical storage devices, solid-state storage device such as a random access memory ("RAM") and/or a read-only memory ("ROM"), which can be programmable, flash-updateable and/or the like. The computer-readable medium of 110 (optionally, in combination with database 106 and other data storage devices) can provide remote, local, fixed, and/or removable storage devices plus storage media for temporarily and/or more permanently containing, storing, transmitting, and retrieving computer-readable information.

Online account server 104 may also comprise software elements, including an operating system and/or other code, such as an application program (which may be a client application, Web browser, mid-tier application, RDBMS, etc.). It will be appreciated that alternate embodiments of online account server 104 may be used in system 100. For example, elements shown as software might be implemented in hardware.

A user may wish to use an online account access control feature to maintain an online account in a "locked" state and to "unlock" an account only when the user is actively using the online account. An implementation of this use of online account access control is illustrated with reference to FIG. 2.

Figure 2:
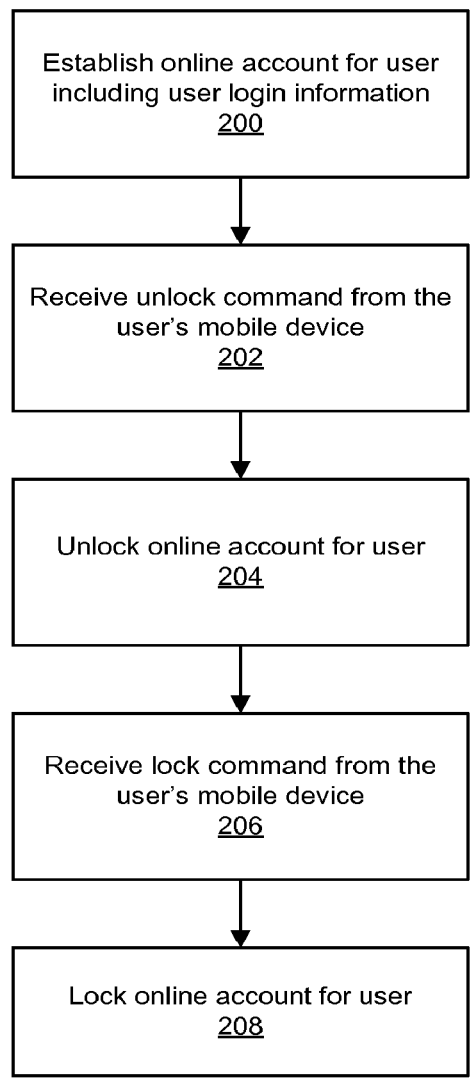
FIG. 2 shows an illustrative flow chart for unlocking and locking an online account.

FIG. 2 shows an exemplary use of system 100 to unlock and lock an online account in accordance with an embodiment. At operation 200, an online account can be established for a user. The online account may have associated login information. At operation 202, an access control message can be received by online account server 104 from mobile device 102. The access control message may include an action to be performed on an online account, such as an "unlock" action enabling access to the online account. For example, the message may be an SMS including the word "unlock." Online access module 122 of online account module 104 may enable access to an online account associated with mobile device 102 in response to receiving the access control message, as indicated at operation 204. For example, online access module 122 may search stored data, such as data stored at data storage element 110 or online account database 106, for an online account associated with the identifying information of mobile device 102 (such as a phone number of mobile device 102). When access to the online account is enabled, the user may login to the account using login information associated with the online account such as username and password. The user may login to the account from mobile device 102 or from another device. In some embodiments, the account is unlocked for a pre-established period of time. Alternatively, a user may send a subsequent command to lock the account.

At operation 206, an access control message including a "lock" action may be received by online account server 104 from mobile device 102. The lock action may indicate that the user wishes to disable access to the online account. At operation 208, online access module 122 of online account module 104 may disable access to an online account associated with mobile device 102. For example, online access module 122 may search stored data for an online account associated with the identifying information of mobile device 102. When access to the online account is disabled, no user will be able to access the online account using the login information.

It will be recognized that the access control messages to "unlock" and "lock" the online account as described with reference to FIG. 2 could be sent in reverse order, i.e., the online account could be locked for a period of time and subsequently unlocked. In some embodiments, when access to the online account is disabled ("locked"), the user may login to the account using login information associated with the online account, but no updates to the online account may be made. In other embodiments, when access to the online account is disabled, an online account that is viewable by other users (e.g., a social networking account) is no longer visible to other users. It will be recognized that an account may be enabled and/or disabled in various ways in response to receiving an access control message.

In some embodiments, an access control message can be used to change a functionality of a device. For example, it may be desirable to lock a device, such as a wireless router, for a period of time when a user does not wish for the device to be used (e.g., a parent may wish to curtail usage of the internet by a child during a particular period of time).

Figure 3:
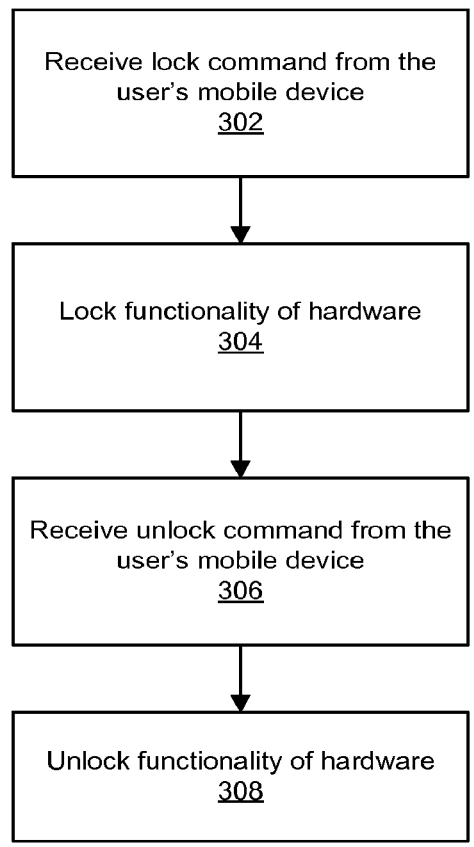
FIG. 3 shows an illustrative flow chart for using an access control message to lock and unlock a device.

FIG. 3 shows an illustrative use of an access control message to lock and unlock a device. At operation 302, mobile device 102 can send an access control message to a device such as a wireless router. The access control message can include an action to be performed on the wireless router. For example, the action could be a "lock" action that prevents the wireless router from transmitting information. At operation 304, the wireless router can disable transmissions in response to the received access control message. The wireless router may determine whether identifying information (e.g., a phone number) for the mobile device 102 from which the access control message was received matches identifying information stored in a memory of the wireless router. In some embodiments, the device can be locked for a pre-established period of time. Alternatively, a user can transmit an unlock command when the user is ready for the device to be re-enabled. At operation 306, mobile device 102 can send an access control message to the device including an "unlock" action to be performed on the wireless router. At operation 308, in response to receiving the access control message, the wireless router can re-enable transmissions. It will be recognized that the access control messages to "lock" and "unlock" the device as described with reference to FIG. 3 could be sent in reverse order, i.e., the device could be unlocked for a period of time and subsequently locked.

A user may be concerned about the potential for an access control message appearing to originate from the user's mobile device to be sent from an unauthorized user. For example, an unauthorized user may be able to generate a message including identifying information from the user's mobile device although the message from the unauthorized user is actually generated by a different device. To provide added security, the online account server 104 may send a message to the user's mobile device prompting mobile device 102 to provide a response message. In this way, even if an access control message is generated form an unauthorized device, a prompt for additional security information sent to an authorized device can be used to ensure that no action will be taken based on an access control message generated from an unauthorized device.

Figure 4:
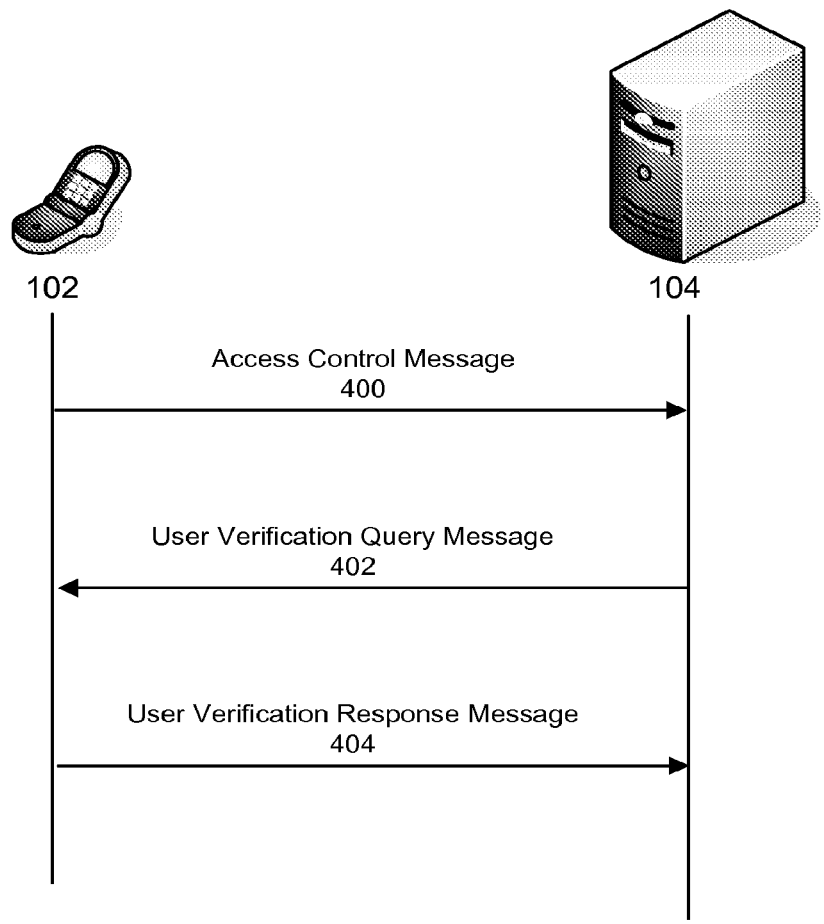
FIG. 4 shows an illustrative message exchange including a request for a user verification response message.

FIG. 4 shows an illustrative message exchange including a request for a user verification response message, in accordance with an embodiment. Mobile device 102 can send an access control message 400 to online account server 104. The access control message 400 can be an SMS, instant message, e-mail, message generated by an application (such as a signed application) of mobile device 102, or other message. The access control message 400 can include an action to be performed on an online account. For example, the action can be one or more of: preventing a user from accessing the online account with login information for the online account, enabling a user to access the online account using login information for the online account, disabling editing of information associated with the online account, enabling editing of information associated with the online account, disabling transmitting e-mail from the account, enabling transmitting e-mail from the account, disabling public access to the online account (e.g., a social networking account), enabling public access to the online account, and so on. In some embodiments, a text command, such as "lock" or "unlock" can be included in an SMS sent to a phone number for routing to an online account server. In other embodiments, a user may select a command from a user interface of an application and the application may generate a message (e.g., an SMS or other message format) including information representative of the command.

When online account server 104 receives access control message 400, online account server 104 can generate user verification query message 402 and send user verification query message 402 to mobile device 102. User verification query message 402 may be an SMS, e-mail, instant message or other message receivable by mobile device 102. User verification query message 402 may include a request for the user to provide verification information, such as personal information known to the user (e.g., last four digits of the user's social security number, mother's maiden name, user's place of birth, etc.) In some embodiments, user verification query message 402 may include a code generated by online account server 104. In various embodiments, the user verification query message 402 is a message receivable by a verification application (e.g., signed application 114) of mobile device 102 that is configured to determine identifying information about mobile device 102 (e.g., MSISDN and/or IMSI).

When mobile device 102 receives user verification query message 402, mobile device 102 may send a user verification response message 404 to online server 104. For example, if user verification query message 402 requests verification information, the user may enter the verification information into a message such as an SMS, or enter input into an application interface of an application configured to send a message. The message is sent as user verification response message 404 to online server 104. If user verification query message 402 requests that the user respond with a code included in user verification query message, the user can enter the code in a message such as an SMS and send the message to online server 104. In some embodiments, a verification application of mobile device 102 may send a user verification response message to online account server 104 automatically (i.e., without requiring user input). The user verification response message 404 may include a cryptographic hash value, such as a hash of identifying information of mobile device 102 and additional information such as a current date and/or time. When online account server 104 receives user verification response message 404, validation module 108 may compare information in the user verification response message 404 to verification information stored in data storage 110 (and/or verification information stored in online account database 106 or on another server associated with the online account). For example, validation module may search for validation information stored in association with identifying information of mobile device 102, such as the phone number of mobile device 102. If the user verification response message 404 can be verified, e.g., based on a match between received verification information and stored verification information, one or more actions indicated in access control message 400 may be taken.

Figure 5:
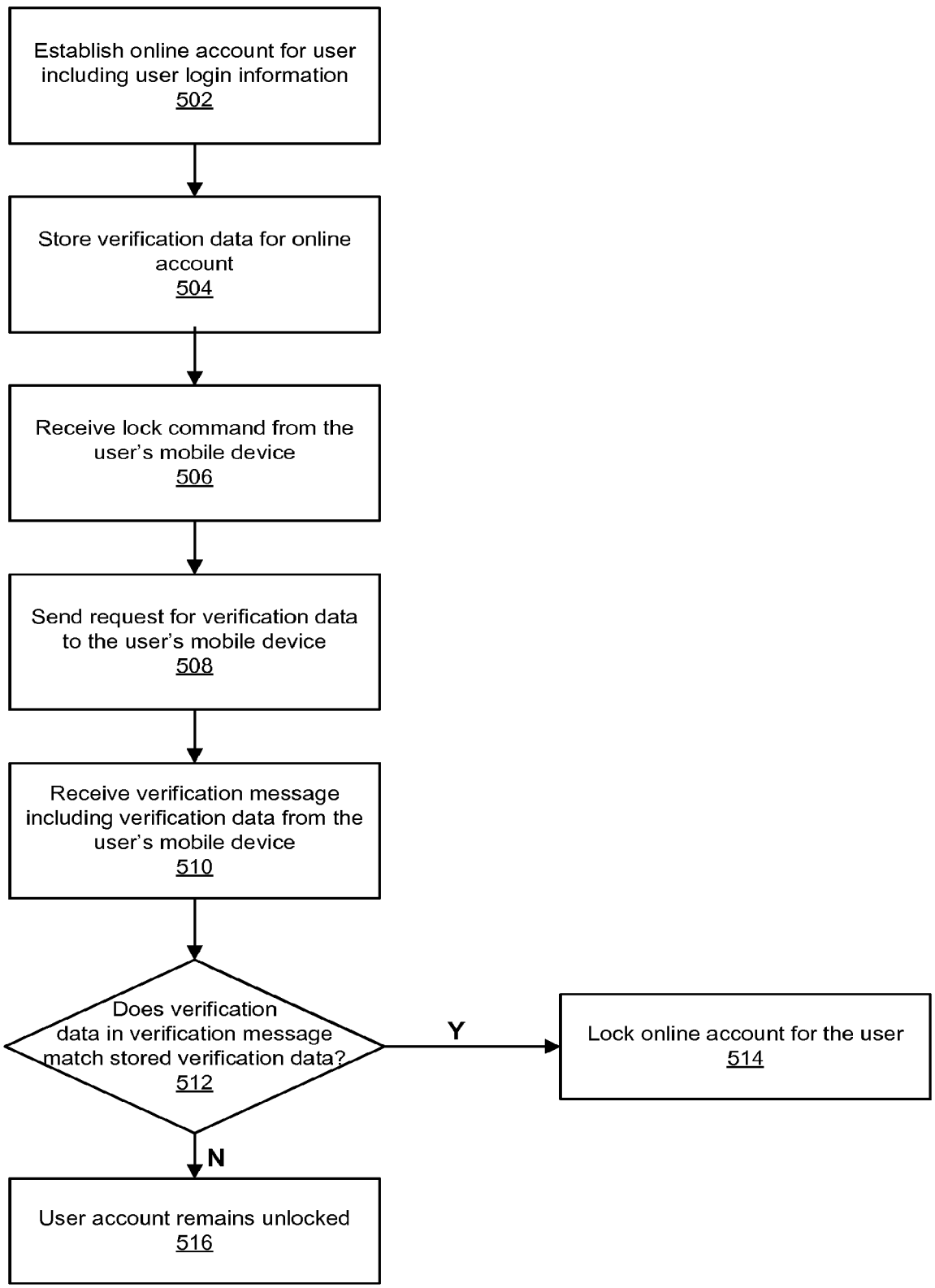
FIG. 5 shows an illustrative flow chart for access control of an online account including verification.

FIG. 5 shows an illustrative use of system 100 for online account access control including verification, according to an embodiment. At operation 502, an online account can be established for a user. The online account may have associated login information, such as a user name and password usable by a user to access the online account. At operation 504, verification information can be stored in association with the online account. For example, a user may be prompted to provide verification information when creating an online account or subsequent to creating an online account, or a user may wish to establish verification functionality after an online account has been created. Verification information is typically information that is different from the login information. Verification information can include one or more of identifying information for mobile device 102, personal information known by the user, etc. In some embodiments, verification information is generated by online account server 104 when an access control message is received by the online account server. In a further embodiment, verification information can be generated by mobile device 102 when a user verification query message is received by the mobile device.

At operation 506, an access control message can be received by online account server 104 from mobile device 102. The access control message may include an action to be performed on an online account, such as a "lock" action for disabling access to the online account. For example, the message may be an SMS including the word "lock."

At operation 508, online account server 104 may send a user verification query message to mobile device 102. The query message may be an SMS asking the user to provide verification information. At operation 510, online account server 104 may receive a user verification response message from mobile device 102. The user verification response message may be an SMS including verification information entered by the user.

At decision diamond 512, validation module 108 of online account module 104 may determine whether verification information in the user verification response message is valid. For example, validation module 108 may determine wither the received verification information matches verification information stored in data storage 110 of online account server 104, in online account database 106, or in another storage location. If the verification information in the user verification response message is determined to be valid, online account access module 122 of online account server 104 may perform the action indicated in the access control message. For example, if the action is a "lock" action, online account access module 122 may lock the online account, as indicated at operation 514. If the verification information in the user verification response message is not determined to be valid, the online account may remain unlocked, as indicated at operation 516.

In some embodiments, verification is performed by determining if a user currently has an active status in an application or an online account other than the online account for which an access control message is sent. For example, online account server 104 may receive an access control message for an e-mail account from a user of mobile device 102 and online account server 104 may be able to determine if the user currently has an active status in an instant messaging account. If online account server 104 determines that the user has an active status in the instant messaging account, online account server 104 may execute the action indicated in the access control message. In other examples, online account server 104 may validate the access control message by determining whether a user has an active status in an application other than the online account, such as an e-mail account, social network account, validation application, or other account or application. Online account server 104 may determine an active status via communications with mobile device 102, via an application executing on online account server 104, or via communication with another server with which the application or account is associated.

Figure 6:
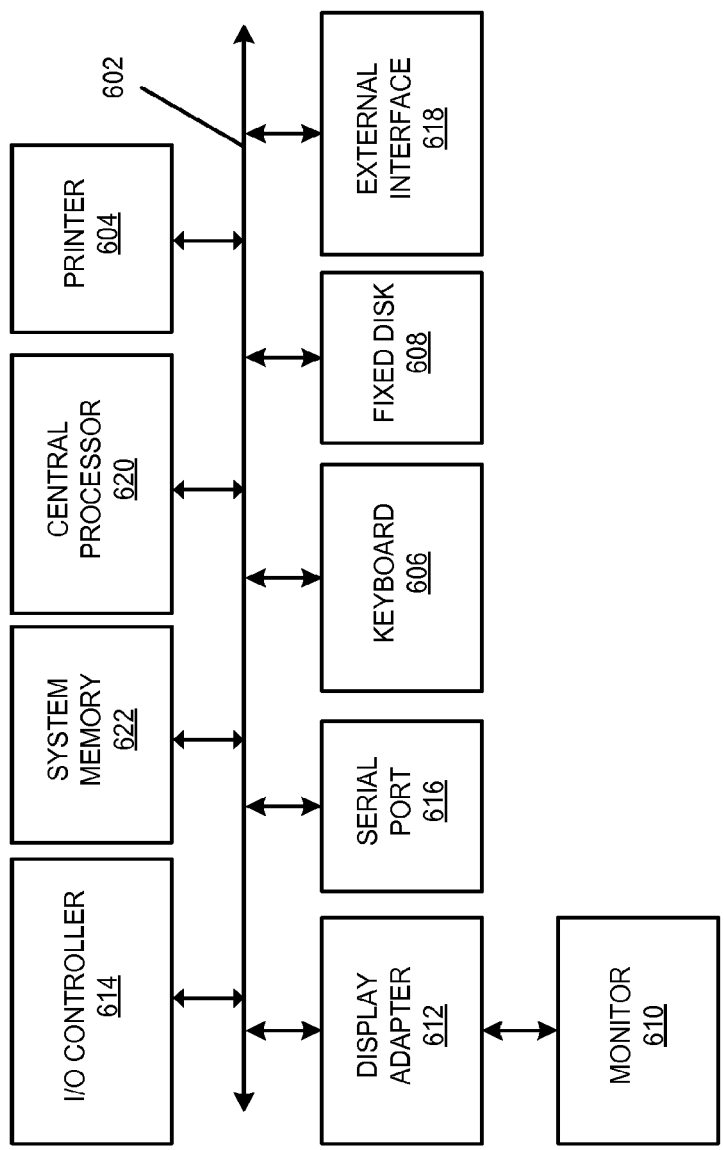
FIG. 6 shows an illustrative block diagram of a computer system.

Referring now to FIG. 6, an exemplary computer system according to one embodiment is illustrated. The system may be used to implement any of the computer systems described above (e.g., online account server, online account database, mobile device, etc.). The subsystems shown in FIG. 6 are interconnected via a system bus 602. Additional subsystems such as a printer 604, keyboard 606, fixed disk 608 (or other memory comprising computer readable media), monitor 610, which is coupled to display adapter 612, and others are shown. Peripherals and input/output (I/O) devices, which couple to I/O controller 614 (which can be a processor or other suitable controller), can be connected to the computer system by any number of means known in the art, such as serial port 616. For example, serial port 616 or external interface 618 can be used to connect the computer apparatus to a wide area network such as the Internet, a mouse input device, or a scanner. The interconnection via system bus allows the central processor 620 to communicate with each subsystem and to control the execution of instructions from system memory 622 or the fixed disk 608, as well as the exchange of information between subsystems. The system memory 622 and/or the fixed disk 608 may embody a computer readable medium.

It should be understood that the present technology as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

One or more features from any embodiment may be combined with one or more features of any other embodiment without departing from the scope of the technology.

A recitation of "a", "an" or "the" is intended to mean "one or more" unless specifically indicated to the contrary.

What is claimed is:

1. A method for initiating an action for an online account, comprising:
   receiving, by a mobile device from a user of the mobile device, a request to perform an action with respect to an online account, wherein the online account is associated with an accessibility status indicating whether the account can or cannot be accessed via a login using correct login information, such that a "locked" accessibility status indicates that the account cannot be accessed even using correct login information for the online account, wherein the action comprises updating a current status of the online account to the "locked" accessibility status;
   generating, via a signed application on the mobile device, an access control message that includes an indication of the action and a digital signature generated using a private key stored on the mobile device;
   establishing a network connection with a server associated with the online account;
   transmitting the access control message and identifying information for the mobile device to the server via the network connection, wherein the server is caused to:
   determine, based on the identifying information, the online account;
   verify the authenticity of the digital signature using a public key associated with the mobile device;
   upon verifying the authenticity of the digital signature using the public key, determine, based on the access control message, that the mobile device is authorized to initiate the action with respect to the account by comparing the identifying information associated with the mobile device to verification information stored in association with the online account;
   upon determining that the mobile device is authorized to initiate the action with respect to the online account, transmit, to the mobile device, a verification message;
   receive, from the mobile device, a response to the verification message that includes verification information which is different from the login information; and
   upon determining that the verification information matches information stored in relation to the online account, update the accessibility status of the online account to reflect a "locked" status;
   upon determining that the verification information does not match the information stored in relation to the online account, prevent update of the accessibility status of the online account, such that the account remains in an "unlocked" status; and
   receiving, by the mobile device from the server, a notification indicating that the accessibility status of the online account has been updated.

2. The method of claim 1, further comprising:
   receiving, by the mobile device from the user of the mobile device, a second request to perform a second action with respect to the online account, wherein the second action comprises updating a current status of the online account to an "unlocked" accessibility status such that the account can be accessed using correct login information;
   generating, via the signed application on the mobile device, a second access control message that includes an indication of the second action and a second digital signature generated using the private key stored on the mobile device;
   establishing a second network connection with the server associated with the online account; and
   transmitting the second access control message and identifying information for the mobile device to the server via the second network connection.

3. The method of claim 1, wherein the access control message is a short message service (SMS) message, and the network connection is a short message service communication session.

4. The method of claim 1, wherein the access control message includes a cryptographic hash value.

5. The method of claim 1, further comprising initiating, via the mobile device, an enrollment process, wherein the server is caused to associate the identifying information with the online account during the enrollment process.

6. The method of claim 1, wherein the identifying information associated with the mobile device is a phone number.

7. The method of claim 1, wherein the identifying information associated with the mobile device includes at least one of a Mobile Subscriber Integrated Services Digital Network (MSISDN) number, an International Mobile Subscriber Identity (IMSI), or an International Mobile Station Equipment Identifier (IMEI).

8. The method of claim 1, wherein the identifying information is associated with the online account upon creation of the online account.

9. The method of claim 8, wherein the mobile device is associated with the online account by virtue of having been provided to the server during the creation of the online account.

10. The method of claim 8, wherein the identifying information is associated with the online account by virtue of the online account having been created using the mobile device.

11. A mobile device configured to control access to an online account, comprising:

a processor; and a non-transitory computer readable medium coupled to the processor, wherein the computer readable medium includes instructions, that when executed by the processor, cause the mobile device to:

receive, from a user of the mobile device, a request to perform an action with respect to an online account, wherein the online account is associated with an accessibility status indicating whether the account can or cannot be accessed via a login using correct login information, such that a "locked" accessibility status indicates that the account cannot be accessed even using correct login information for the online account, wherein the action comprises updating a current status of the online account to the "locked" accessibility status;

generate, via a signed application on the mobile device, an access control message that includes an indication of the action and a digital signature generated using a private key stored on the mobile device;

establish a network connection with a server associated with the online account;

transmit the access control message and identifying information for the mobile device to the server via the network connection, wherein the server is caused to:

determine, based on the identifying information, the online account;

verify the authenticity of the digital signature using a public key associated with the mobile device;

upon verifying the authenticity of the digital signature using the public key, determine, based on the access control message, that the mobile device is authorized to initiate the action with respect to the account by comparing the identifying information associated with the mobile device to verification information stored in association with the online account;

upon determining that the mobile device is authorized to initiate the action with respect to the online account, transmit, to the mobile device, a verification message;

receive, from the mobile device, a response to the verification message that includes verification information which is different from the login information; and upon determining that the verification information matches information stored in relation to the online account, update the accessibility status of the online account to reflect a "locked" status;

upon determining that the verification information does not match the information stored in relation to the online account, prevent update of the accessibility status of the online account, such that the account remains in an "unlocked" status; and receive, from the server, a notification indicating that the accessibility status of the online account has been updated.

12. The mobile device of claim 11, wherein the instructions comprise a mobile application installed upon the mobile device.

13. The mobile device of claim 11, wherein the instructions further cause the mobile device to:

obtain a verification code; and provide the verification code to the server in the access control message, wherein the mobile device is determined to be authorized to initiate the action with respect to the account upon verification of the verification code.

14. The mobile device of claim 13, wherein the verification code is obtained by the mobile device from the server.

15. The mobile device of claim 14, wherein the verification code is obtained during an enrollment process.

16. The mobile device of claim 11, wherein the instructions further cause the mobile device to generate a cryptographic hash value to be included in the access control message.

17. The mobile device of claim 11, wherein the access control message is an instant messaging service message.

18. The mobile device of claim 11, wherein the identifying information associated with the mobile device includes at least one of a Mobile Subscriber Integrated Services Digital Network (MSISDN) number, an International Mobile Subscriber Identity (IMSI), an International Mobile Station Equipment Identifier (IMEI), or a phone number.

* * * * *